Jan. 14, 1930.  W. J. MURDOCK ET AL  1,743,726
PROCESS FOR MANUFACTURE OF PRODUCER GAS
Original Filed Sept. 23, 1924
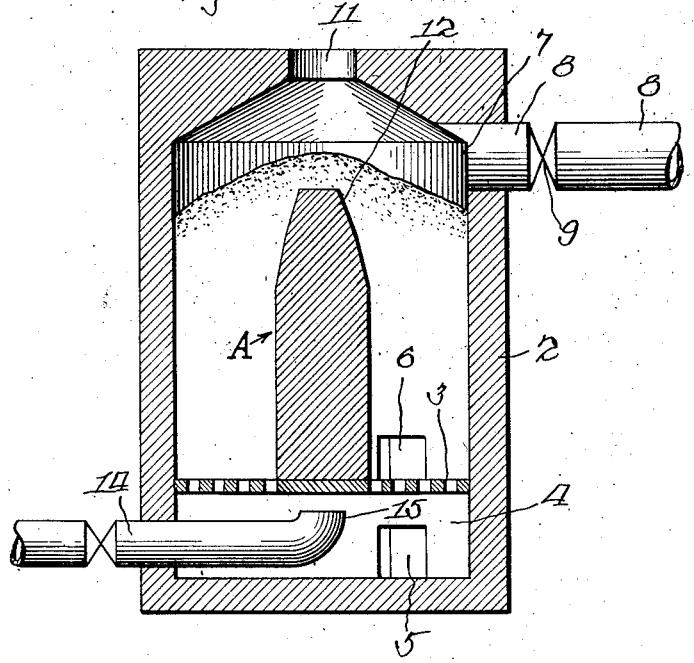
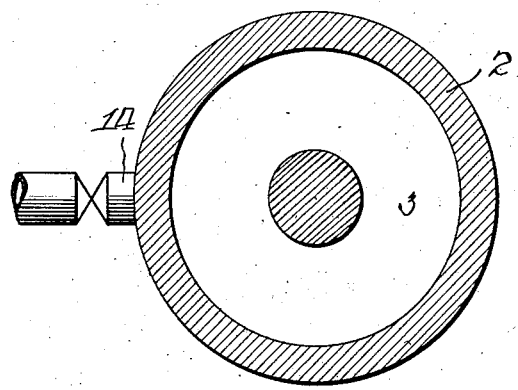

Patented Jan. 14, 1930

1,743,726

UNITED STATES PATENT OFFICE

WILLIS J. MURDOCK, OF JOLIET, AND EDGAR E. LUNGREN, OF AURORA, ILLINOIS, AND OWEN B. EVANS, OF PHILADELPHIA, PENNSYLVANIA, ASSIGNORS TO PIER PROCESS CORPORATION, OF AURORA, ILLINOIS, A CORPORATION OF ILLINOIS

PROCESS FOR MANUFACTURE OF PRODUCER GAS

Original application filed September 23, 1924, Serial No. 739,282. Divided and this application filed August 28, 1926, Serial No. 132,269. Renewed September 7, 1929.

This invention relates to improvements in process for manufacture of producer gas and the present application is a division of our co-pending application, Ser. No. 739,282, filed September 23, 1924, now Patent 1,602,242, granted October 5, 1926.

In the manufacture of combustible gas, such as producer gas, from solid fuel, one of the main operations is the blasting which takes place in the producer, by which the bed of fuel is gradually and progressively reduced and heated to incandescence in order to permit the necessary chemical reactions taking place in the producer.

Gas generating fuels as received at the gas producer are ordinarily composed of mixed sizes, and as the fuel is charged into the usual cylindrical producer, it is a well known fact that the finer or smaller particles of the fuel, sometimes referred to as the "fines", tend to concentrate in the center of the producer, and the larger or coarser particles tend to gravitate or roll towards the confining walls, that is, there is a natural tendency of solid fuels to more or less segregate into an outer mass of larger or coarser particles, and an inner or central core or mass of finer or smaller particles. Furthermore, when the fuel is charged into the producer from the top, as customary, there is a natural tendency of the fuel to crown at the center on the top of the fuel bed.

Experience has demonstrated that where the fuel in the producer is permitted to follow its normal course in the manner indicated in the preceding paragraph there is a very noticeable variation in the degrees of permeability of the fuel bed to the passage of the blast gases through the supporting grate and through the fuel bed or in the reverse direction, the outer portion of the mass adjacent the retaining walls of the generator offering a very much less resistance to the passage of the blasts therethrough than the central portion or mass, with the result, in actual practice, that the outer portion of the fuel bed for a more or less determinable definite distance from the wall, depending upon the particular characteristic of the fuel being used, becomes activated or what is known as an "active area", whereas the central mass of the fuel bed becomes what is known as an "inactive area".

As the fuel is consumed in an ordinary producer of circular cross section, and new charges added, the entire mass descends gradually and slowly to the grate. When a fuel low in volatile matter is used, such as anthracite coal or coke, it passes from the upper zone of what is called "green" or comparatively cold fuel to the next lower zone of incandescent fuel during the distillation, carbonization and processing thereof and finally from the incandescent zone down to the last zone of spent fuel or ashes resting upon the grate. When fuel high in volatile matter is used, such as bituminous coal, there is an additional zone, commonly called the "plastic zone", which forms above the incandescent zone due to the driving off of the large amounts of volatile matter therefrom in the distillation and processing thereof to the coke condition necessary to obtain the proper gas reaction. During this gradual descent of the fuel through the producer, the outer portions of the fuel, in contact with or closely adjacent to the retaining walls of the producer, are appreciably retarded in their movements because of the friction between those portions of the fuel and the walls, whereas the denser portion of the mass of fuel is free to settle more quickly, thus producing a differential settling action, which further tends to compact or solidify the center portion of the fuel and loosen or render more permeable the outer peripheral portions of the fuel. The settling action described further tends to increase the difference in permeability to the blasts between that of the outermost portions and that of the center portions of the fuel bed.

Another factor still further tending to increase the difference in permeability between the outermost portions, and the inner portions of the fuel bed, when bituminous coal is used in the producer, is that which results from the formation under heat, of the plastic zone referred to, which during the progression of combustion envelops the central inert mass, so as to completely cut off the same from blasting and carbonization. This condition is due to the difference in permeability referred to, causing a distinct and well known tendency of the air or other fluid used, when introduced below the grate, to select a passage up through the producer between the refractory wall and the fuel itself, rather than through the body of the fuel, resulting in much more rapid combustion and higher temperatures being evolved, in this portion of the fire. This condition is observable in connection with all kinds of gas producer fuels, but in the case of a soft coal fire is accentuated because there is a shrinkage of the fuel away from the refractory wall of the producer during the process of carbonization, giving a still freer passage to the air blasting medium. The high degree of heat which is thus evolved about the periphery of the fire progresses through the bed of fuel horizontally relatively to the refractory walls of the producer, and to a known limited distance from such walls, and this portion of the fuel rapidly reaches a state of incandescence during the blast, ready for the gas reaction, for a horizontal width of substantially from 18 to 24 inches, inwardly from the wall of the producer, which is an appreciable distance from the center thereof. This action causes the formation, during the various stages of progression of the active portion of the fuel, of the sticky plastic zone of partially coked fuel immediately in advance of the incandescent area throughout its extent, and since such area extends inwardly from the wall of the producer only approximately from 18 to 24 inches, the plastic formation completely surrounds the inner mass of the fuel bed. Inside of this plastic envelop there will be found fuel which is not completely distilled or carbonized, to a depth reaching to, or almost to the grate, which is impervious to the blast, and the consequence is that this inert mass is almost entirely inactive and uncarbonized.

The result of the combination of all or some of the foregoing factors normally tending to take place in a producer of the usual character with the usual method of manufacture where the entire mass of fuel is supported on a grate of the usual character, is to produce an outer mass or area, which is relatively very active and subject to rapid combustion, and an inner central portion or mass which is inactive and in which little or no combustion takes place. Furthermore, where a very active area is developed, so-called "weak spots" are produced in those portions of the fuel bed with the result that "channelling" ensues, thus permitting a relatively excessive flow of the blasting medium in and adjacent the channels, more rapid burning or consumption of the adjacent fuel, and an increased flow of the blasting medium. In such condition of unstable equilibrium, the channelling action becomes progressive and may, and often does, reach a point such that all the blast is practically concentrated in one path through the body of fuel and this, in turn, permits the blast to assume a very high velocity in its passage through the fuel and to carry with it portions of solid fuel over into the fixing chamber, thus causing frequent clogging of the latter, and necessitating shutting down to clean it out, with consequent loss of time and use of the apparatus.

The foregoing condition occurs with all solid gas generating fuels in general, and is particularly accentuated when bituminous coal is used, due to its immobile and sticky character when partially coked, causing it to form the plastic zone which is not only impervious to blasting as before stated, but will not of itself, fill the holes or channels which may be formed, and it becomes necessary to bar the fuel bed frequently.

Objects of our invention, therefore, are to provide improvements in the process of manufacturing a combustile gas, such as producer gas, from solid fuel, which will obviate the disadvantageous conditions hereinbefore described; to so carry out the action in the producer as to insure a bed of fuel of practically or substantially uniform permeability to the blast products and render the entire body substantially uniformly active; to increase the activated area of the fuel bed; to eliminate the formation of the inactive or more or less impermeable portions of the fuel bed; and, in general, to materially increase the efficiency and economy of operation of the steps of the process in the producer necessary in the manufacture of a combustible gas.

Our invention, considered from some of its broader aspects, consists in so disposing or disbursing the conglomerate mass of solid fuel as it is changed in the producer in its passage through the producer, that every portion of the fuel bed will be within an "active" area with respect to a radiating wall of the producer; in preventing the initiation of the formation of a compacted, relatively impermeable portion at any point in the fuel bed; in uniformly distributing the porosity of the fuel bed by co-ordinating the cross-sectional area of the fuel bed relative to its bounding surfaces as to prevent the formation of inactive cores; in so distributing the fuel while subjected to action in the producer, that the distance between any two walls transversely of the fuel bed does not exceed twice the width of the known or determinable active area of the fuel with respect to a radiating wall and in so distributing the fuel that it may be blasted substantially uniformly throughout its area.

In the drawing forming a part of this specification, Figure 1 illustrates a more or less diagrammatic view indicating a vertical, diametrical section of a producer of cylindrical form adapted for the carrying out of our improved process; and Figure 2 is a transverse, sectional view of the producer shown in Figure 1.

In said drawing, the gas producer proper is indicated at 2, the same being preferably of cylindrical formation as generally employed, and preferably lined on the interior of the outer confining wall with refractory material. Said producer is preferably provided with a horizontally extended grate 3, which may be of usual construction and disposed above the bottom of the producer proper so as to leave an ash pit 4 from which some of the ashes may be removed through a suitable ash pit door 5. Clinker doors of any desirable construction are indicated conventionally at 6. As customary in a producer of this character, the producer is provided with an offtake passage 7, near the top, the gases being conducted through a suitable pipe 8 having a control valve 9. The fuel, as customary, is charged through the top opening 11.

For the purpose of carrying out our invention in the type of producer shown, we provide a centrally disposed pier or cone indicated broadly by the reference character A, said pier or cone A preferably being of circular cross section and disposed centrally of, and supported upon the grate 3. Such pier may be of any desired construction, that is, either hollow or solid, or of a suitable built up construction where intended for application to a producer already in use, and is preferably composed of suitable refractory material. The topmost portion of the pier is preferably cone shaped, as indicated at 12, so as to facilitate the uniform distribution of the fuel all around the producer as the fuel is charged through the top opening 11. In actual practice, and this is an important consideration in our invention, the pier will be extended well up into the green or loose zone of the fuel, and preferably substantially level with the offtake opening 7. In this manner, the beginning or initiation of the formation of a central inactive zone in the body of the fuel at any stage of distillation, carbonization or processing thereof, is prevented. Furthermore, the amount of fines in the fuel which would normally tend to concentrate and compact in the center portion of the producer occupied by the pier A, will be distributed in an annulus of much greater radius, and thoroughly intermingle with the larger portions of the conglomerate mass of fuel.

As above indicated, the pier A may be either hollow or solid. We have shown it of solid construction having on the exterior thereof a refractory surface similar to the refractory surface on the interior of the outer confining wall of the producer proper and so as to provide for radiation as will be understood. A conduit 14 is provided in the lower part of the producer which extends into the ashpit 4 a suitable distance with an upturned outlet end 15, terminating below the grate and through which the blasting oxidizing fluids or mediums, combined with or without a suitable cooling medium when making producer gas, are adapted to be supplied to the producer and it will be observed that the blasts will pass upwardly through the grate and be uniformly distributed throughout the area of the fuel bed and pass vertically upwardly thereof.

From the preceding description, considered in connection with the drawings, it will be observed that the blasts have equal and uniform accessibility to the bottom of the fuel through all portions of the grate, thus insuring uniform admission of the blasts to the body of the fuel. By proportioning the producer so that the distance between the opposed wall surfaces of the producer and the pier is at no point more than twice the known width of the active area of the fuel with respect to a retaining radiating wall, all portions of the fuel are necessarily arranged within such active area with respect to such walls through the entire mass of fuel from top to bottom. Furthermore, not only are all portions of the fuel located within an active radiating area of a retaining or confining wall, but, in addition, the extension of the central pier well up into the loose or green fuel zone to a point substantially on a level with the offtake, prevents the initiation or formation of any centrally disposed, inert or inactive or impermeable core or mass with the result that the body of fuel, as it gravitates down through the producer from the loose or green fuel zone to the incandescent zone, is distilled and processed uniformly throughout the cross-sectional area of the body of fuel.

A common size for a producer of circular cross-section with a bottom such as indicated in the drawing and hereinbefore described, used in the manufacture of a combustible gas, is one having an inside diameter of 9 feet. With such a producer, using bituminous coal as the generating fuel, we have found from actual experience, that very efficient results are obtained with our invention where a pier or cone, such as shown in Figure 1 of refractory material is employed of 3 feet outside diameter, centrally disposed on the grate as indicated in the drawing. With such an arrangement, it will be observed that there is no portion of the fuel bed which is more than 18 inches from any radiating wall of the producer, and further, that the blasts are over the entire grate-supported area of the fuel bed with equal facility and action at all points, thus assuring uniformity of combustion within the entire body of the fuel. Actual practice has demonstrated that, where the blasts are permitted to enter the body of the fuel through the grate with relative uniformity throughout the entire area supported by the grate, that active zones will be formed within a distance of about 18 to 24 inches of any refractory wall, this active zone being assured by the passage of the gases through the fuel or by radiation from the heated refractory surfaces, or by a combination of the two. Consequently, it will be observed that by the use of our invention, all portions of the fuel are brought within an assured active zone of substantially uniform permeability and uniform rate of combustion.

By way of comparison, we have found that excellent results are obtained, using bituminous coal, where the producer is of 9 feet internal diameter and the pier is of 3 feet outside diameter. Roughly stated, without the central pier, the active area of such a producer would be that of an annulus having an outside diameter of 9 feet and an inside diameter of 6 feet (that is, 9 feet less two times approximately 18 inches) or approximately 35.3 square feet whereas, by the introduction of the pier of 3 feet outside diameter, the active area is increased to that of an annulus having 9 feet outside diameter and 3 feet inside diameter, or approximately 56.6 square feet, that is, an increase of approximately 60% in the active area of the body of fuel considered in cross-section. By employing our improved process, the amount of fuel blown over is very materially decreased; the amount of fuel required per thousand feet of gas is materially decreased; the amount of clinkers formed is materially decreased; and the capacity of a producer employing our improvements is very substantially increased.

We have herein shown and described what we now consider the preferred manner of carrying out our invention. All changes and modifications are contemplated that come within the scope of the claims appended hereto.

We claim:

1. The herein described improvement in the manufacture of producer gas from solid carbonaceous fuel within a gas producer and wherein the body of fuel gravitates through the producer which includes: confining the path of movement of all portions of the fuel during the processing thereof, within a known, substantially uniformly permeable activated area with respect to radiating bounding walls; and blasting the body of fuel substantially uniformly with air, whereby the ratio of boundary wall surface to the cross-section of the body of fuel is thereby increased, the formation of inactive fuel masses or cores prevented, and uniform processing of the fuel body obtained.

2. The herein described improvement in the manufacture of producer gas from coal of relatively high volatile content which includes: disposing the fuel in an annular column and confining the same between inner and outer refractory walls with all portions of the fuel of the annular column within an effective radiating distance of the refractory walls to thereby prevent formation of an impermeable mass in the fuel; and blasting the column of fuel in a vertical direction substantially uniformly throughout the area of the annular column of fuel with an oxidizing agent.

3. The herein described improvement in the manufacture of producer gas from coal within a gas producer and wherein the body of fuel gravitates through the producer which consists in: passing blasts of an oxidizing agent through an incandescent fuel bed; and confining the path of movement of all portions of the fuel, during the blasting and processing thereof within a known, substantially uniform permeable activated area with respect to radiating bounding walls so that formation of inactive masses is, thereby, prevented and the entire fuel bed blasted and processed uniformly with minimization of channelling.

4. The herein described improvement in the manufacture of producer gas in a gas producer having an offtake near the top thereof which includes: confining the path of movement of the fuel, beginning at a point substantially in line with the offtake of the producer and down into the incandescent zone, into a body whereof all portions of the fuel are within a known, substantially uniformly permeable active area with respect to radiating wall surfaces by which the path of movement of the fuel is governed; and blasting the body of fuel substantially uniformly with an oxidizing agent whereby to prevent initiation of centrally located, substantially impermeable fuel masses in the descent through and from the green or loose fuel zone to the incandescent zone.

5. The herein described improvement in the manufacture of producer gas from carbonaceous fuel of relatively high volatile content in a gas producer wherein the fuel is supported on a grate and the gases are withdrawn from an offtake near the top of the producer which includes: distributing the fuel within the confining walls of the producer from a point substantially in line with said offtake down to the zone of incandescence in such columnar form that all portions of the columnar fuel body are maintained within a known active area and radiating distance relative to the bounding walls of the columnar fuel body from a point substantially in line from the offtake into the zone of incandescence; and blasting the fuel in a vertical direction with an oxidizing agent to thereby process the fuel body uniformly throughout the sectional areas thereof and to minimize channelling and formation of substantially impermeable masses.

6. In the manufacture of producer gas, with an ignited fuel bed and wherein an oxidizing agent is passed through the fuel bed, the improvement for increasing the output which consists in uniformly distributing the porosity of the fuel bed by co-ordinating the cross sectional area of the fuel bed with its bounding surface in such a way that, thereby, the formation of inactive fuel masses or cores, which would otherwise be normally formed in the fuel bed, during blasting, is avoided.

7. The herein described improvement in the manufacture of producer gas, from bituminous coal within a gas producer and wherein the body of fuel gravitates through the producer which consists in: confining the path of movement of all portions of the fuel, during the passage through the zones of distillation and gasification within a distance of approximately 24 inches or less, of a fuel bounding wall; and blasting the body of fuel substantially uniformly with an oxidizing agent, the ratio of bounding wall surface to the cross section of the body of fuel being thereby increased, formation of inactive masses or cores prevented, and uniform processing of the fuel bed obtained.

In witness that we claim the foregoing we have hereunto subscribed our names this 21st day of August, 1926.

WILLIS J. MURDOCK.
EDGAR E. LUNGREN.
OWEN B. EVANS.